Patented Feb. 23, 1937

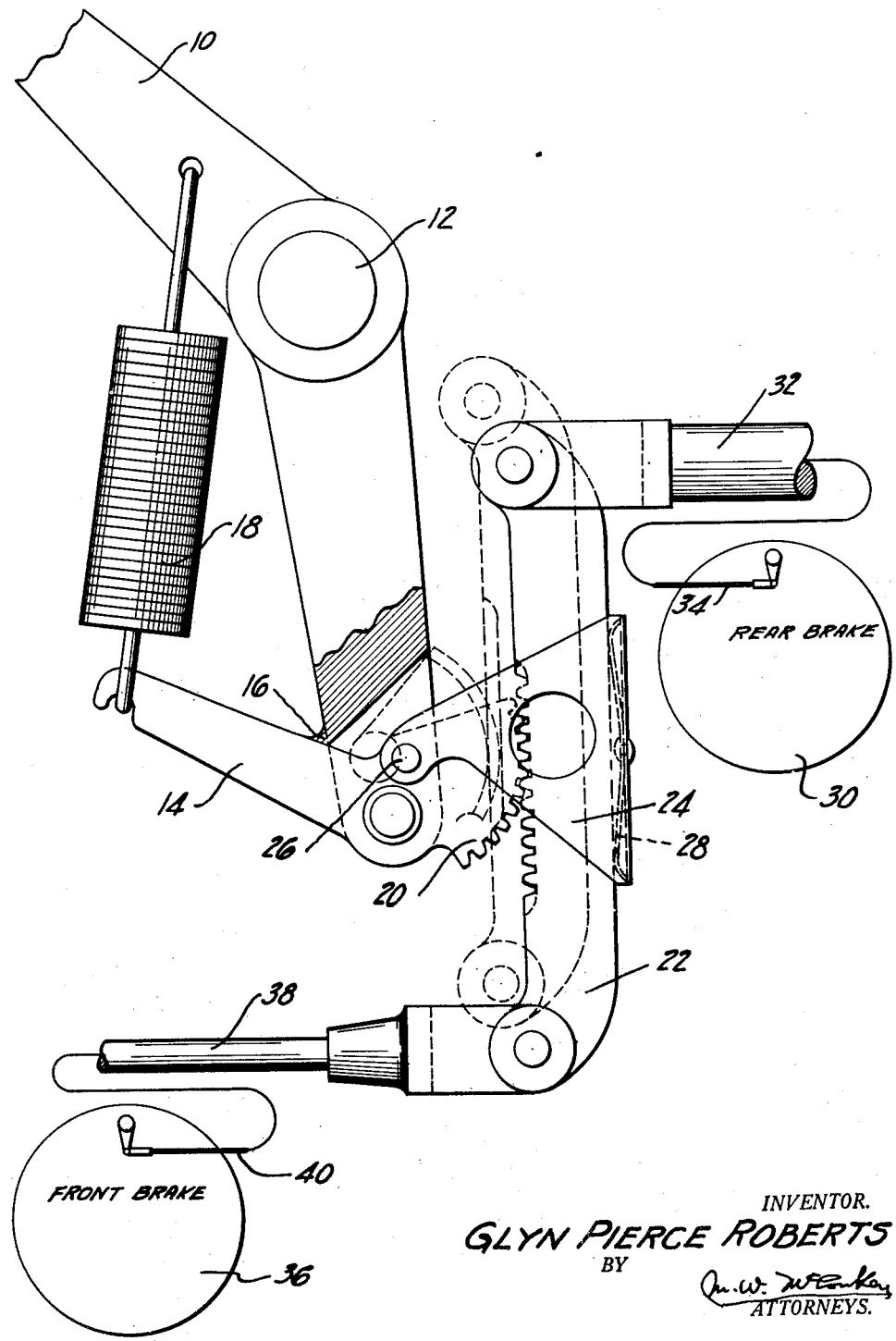

2,071,658

UNITED STATES PATENT OFFICE 2,071,658

BRAKE

Glyn Pierce Roberts, Birmingham, England, assignor to Bendix Products Corporation, South Bend, Ind., a corporation of Indiana Application September 17, 1935, Serial No. 40,954
In Great Britain February 27, 1935

8 Claims. (Cl. 188—204)

This invention relates to improvements in brake operating mechanism for road vehicles.

When a vehicle is decelerating there is a transfer of weight from the rear wheels to the front wheels in a ratio which is proportional to the rate of deceleration and hence to the braking effort applied to the wheels.

For this reason it is desirable that when the brakes are applied forcibly a greater amount of the braking effort should be applied to the front wheels than is applied to the rear wheels so that there is no danger of the rear wheels being locked and causing the vehicle to skid.

The object of my invention is to provide improved brake-operating mechanism in which the distribution of the effort transmitted from a lever or pedal to the brakes on the front and rear wheels of a vehicle is varied automatically according to the force applied to the lever or pedal, the variation preferably only coming into operation after the force applied has reached a predetermined value so that for light braking the force applied may be distributed equally between the wheels.

According to my invention the brakes on the front and rear wheels of a vehicle are applied through a floating balance bar or compensating bar to which a thrust is applied from a pedal or lever at a point of which the effective position on the bar varies according to the force applied to the pedal or lever. Preferably the position of the point at which the thrust is applied to the balance bar is maintained constant for light applications of the brakes by means of a spring which may be loaded to a predetermined extent, the spring yielding when the brakes are applied forcibly and allowing the bar to move relative to the lever or pedal so that the brakes on the front wheels are then applied with greater force than those on the rear wheels.

In one preferred practical form of my invention the brakes on the front and rear wheels of a vehicle are operated by tension or compression members connected respectively to opposite ends of a floating vertical balance bar which is provided on one edge with rack teeth. The brakes are applied by means of a lever or pedal angularly movable about a horizontal axis, and on the lower end of the lever or pedal is pivoted a rocking lever having on one end a toothed segment meshing with the rack teeth on the balance bar and at the other end an arm connected by a tension spring to a point on the brake lever or pedal, the spring normally holding the rocking lever in a fixed position against a stop on the brake lever or pedal.

The balance lever is shown held lightly in contact with the toothed segment on the rocking lever by means of a guard member fitting loosely around the balance bar and pivoted on the rocking lever, a spring being located between the guard member and the edge of the bar opposite the rack to take up the clearance which is provided to prevent jamming.

When the brake pedal or lever is operated the toothed segment on the rocking lever is urged against the balance bar and displaces the bar to apply the brakes, no movement of the rocking lever relative to the brake lever or pedal taking place until the turning moment on the rocking lever is sufficient to overcome the resistance of the spring. When this occurs the rocking lever rocks about its pivot and the toothed segment meshing with the rack teeth on the balance bar displaces the bar longitudinally so that the point of engagement between the segment and the rack is moved towards the end of the bar to which the tension or compression member operating the brakes on the front wheels is connected and a greater proportion of the thrust applied to the bar is transmitted to these brakes.

The displacement of the balance bar and hence the variation in the ratio of the braking effort applied to the front and back wheels respectively increases automatically with the force applied to the brake lever or pedal.

The tension spring controlling the angular movement of the rocking lever is adjustable and the rate of movement of the balance bar and the loading at which this movement begins can be determined by selecting a spring of suitable strength and giving it the desired initial tension.

When the rocking lever is held against its stop by the spring the toothed segment may engage the balance bar at a point equidistant between the connections to the front and rear brakes so that the brakes are applied with equal force under light lever or pedal pressures, or the segment may engage the bar at some other point to give differential braking under all conditions.

The balance bar can be introduced at any convenient point between the brake pedal or lever and the brakes as the rocking lever which engages the balance bar need not be mounted directly on the brake pedal or lever but can be mounted on any other convenient moving part of the mechanism. With some arrangements it may be advantageous to use a compression spring instead of a tension spring, the compression spring resisting the movement of the rocking lever and being preloaded to any desired extent.

The above and other objects and features of the invention will be apparent from the following description of the illustrative embodiment shown in the accompanying drawing, in which:

The figure is a side elevation of the balance bar and its associated parts, with the brake connections shown diagrammatically.

In the arrangement illustrated, an operating member, such as a pedal 10 mounted on a fixed pivot or fulcrum 12 between its ends, has mounted at its lower end a device such as a lever 14 held against a stop 16 on the pedal by means such as a spring 18 tensioned between the body of the pedal and the end of the lever 14.

The opposite end of the lever 14 is formed, as described above, preferably with a rack or gear 20 in thrust engagement with a vertically-arranged balance bar 22 having along its edge rack teeth meshing with the teeth of the rack 20. A guard yoke or the like 24 connected to the pedal by means such as a pivot 26, encircles the balance bar 22, and is shown with a leaf spring 28 urging the teeth of the two racks into mesh.

The upper end of the balance bar 22 is shown connected to rear brakes 30 by suitable compression connections or the like 32 and 34, while the lower end may be connected to front brakes 36 by tension connections 38 and 40 or the like.

As fully explained above, the application of sufficient force on the pedal to overcome the spring 18 will shift the effective point of connection to the balance bar 22 along the length of the bar, thereby changing the ratio of the forces applied to the respective brakes.

While one illustrative embodiment has been described in detail, it is not my intention to limit the scope of the invention to that particular embodiment, or otherwise than by the terms of the appended claims.

I claim:

1. A braking system comprising a plurality of brakes, a brake operating member, connections from said member to said brakes including two parts held in predetermined relationship by a spring, and means operated by force applied to said connections by said operating member sufficient to overcome said spring to change the ratio of the forces applied to said brakes respectively.

2. A braking system comprising a plurality of brakes, a brake operating member, and connections from said member to said brakes including means operated by a predetermined force applied to said connections by said operating member to change the ratio of the forces applied to said brakes respectively.

3. A brake-operating system comprising an operating member, a balance bar connected to different brakes to apply balanced forces thereto, and means connecting said member to said bar including a spring constraining the connection to one point on the length of the bar and mechanism operated by the overcoming of said spring to shift the connection to a different point on said bar.

4. A brake-operating system comprising an operating member, a balance bar connected to different brakes to apply balanced forces thereto, and means connecting said member to said bar including mechanism operated by a predetermined force applied by said member to shift the connection from one to another of two different points on said bar.

5. A brake operating connection including a balance bar, an operating member, and a two-armed lever having a spring connecting one arm to said member and having the other arm connected to said bar in a manner providing for change of the connection along the length of the bar when said spring is overcome by force applied to said member.

6. A brake operating connection including a balance bar, an operating member, and a two-armed lever having a spring connecting one arm to said member and having the other arm connected to said bar by means including a rack and pinion connection.

7. A brake operating connection including a balance bar having teeth along its edge and connected to brakes at its ends, an operating member, a lever pivotally mounted relatively to said member and moved bodily thereby and which has at one end a rack meshing with said teeth, and means yieldingly holding said lever in a predetermined position relatively to said member.

8. A brake operating connection including a balance bar having teeth along its edge and connected to brakes at its ends, an operating member, a lever pivotally mounted relatively to said member and moved bodily thereby and which has at one end a rack meshing with said teeth, and a spring yieldingly holding said lever against a stop on said member.

GLYN PIERCE ROBERTS.